United States Patent
Eltzschig et al.

(10) Patent No.: US 11,972,293 B2
(45) Date of Patent: Apr. 30, 2024

(54) DATA STRUCTURE, MEMORY MEANS AND DEVICE

(71) Applicant: Robert Bosch GmbH, Stuttgart (DE)

(72) Inventors: Christian Eltzschig, Berlin (DE); Dietrich Kroenke, Berlin (DE); Mathias Kraus, Berlin (DE); Matthias Killat, Berlin (DE); Michael Poehnl, Wurmberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 33 days.

(21) Appl. No.: 17/765,058

(22) PCT Filed: Sep. 29, 2020

(86) PCT No.: PCT/EP2020/077204
§ 371 (c)(1),
(2) Date: May 31, 2022

(87) PCT Pub. No.: WO2021/063933
PCT Pub. Date: Apr. 8, 2021

(65) Prior Publication Data
US 2022/0350661 A1  Nov. 3, 2022

(30) Foreign Application Priority Data
Oct. 4, 2019 (DE) .................. 10 2019 215 292.9

(51) Int. Cl.
*G06F 9/50* (2006.01)
*G06F 9/52* (2006.01)
(Continued)

(52) U.S. Cl.
CPC .......... *G06F 9/5016* (2013.01); *G06F 9/5022* (2013.01); *G06F 9/52* (2013.01); *G06F 9/544* (2013.01); *G06F 12/02* (2013.01)

(58) Field of Classification Search
CPC ...... G06F 9/5016; G06F 9/544; G06F 9/5022; G06F 9/52
(Continued)

(56) References Cited

U.S. PATENT DOCUMENTS

| | | | |
|---|---|---|---|
| 2008/0104325 A1* | 5/2008 | Narad ................. | G06F 12/0897 711/E12.043 |
| 2011/0161602 A1 | 6/2011 | Adams et al. | |

(Continued)

FOREIGN PATENT DOCUMENTS

| | | | | |
|---|---|---|---|---|
| CN | 105094751 A | * | 11/2015 | |
| CN | 105103136 A | * | 11/2015 | ......... G06F 12/0253 |
| WO | WO-9936849 A1 | * | 7/1999 | ......... G06F 13/1673 |

OTHER PUBLICATIONS

US 6,081,813 A, 06/2000, Wollrath et al. (withdrawn)
International Search Report for PCT/EP2020/077204 dated Dec. 22, 2020.

*Primary Examiner* — Mahmoud Gimie
(74) *Attorney, Agent, or Firm* — NORTON ROSE FULBRIGHT US LLP; Gerard A. Messina

(57) ABSTRACT

A data structure for a jointly utilized memory device, in particular, for inter-process communication, in an application system. The memory device includes a memory cell. The data structure includes a management structure, the management structure being configured to hold a pointer object to the memory cell.

8 Claims, 3 Drawing Sheets

(51) Int. Cl.
*G06F 9/54* (2006.01)
*G06F 12/02* (2006.01)

(58) Field of Classification Search
USPC .......................................................... 701/104
See application file for complete search history.

(56) References Cited

U.S. PATENT DOCUMENTS

| | | | |
|---|---|---|---|
| 2014/0208054 A1* | 7/2014 | Parthasarathy | G11C 29/16 |
| | | | 711/165 |
| 2019/0065366 A1* | 2/2019 | Muchherla | G06F 3/0689 |
| 2019/0332323 A1* | 10/2019 | Choi | G06F 3/0656 |
| 2020/0327052 A1 | 10/2020 | Nilsen | |

* cited by examiner

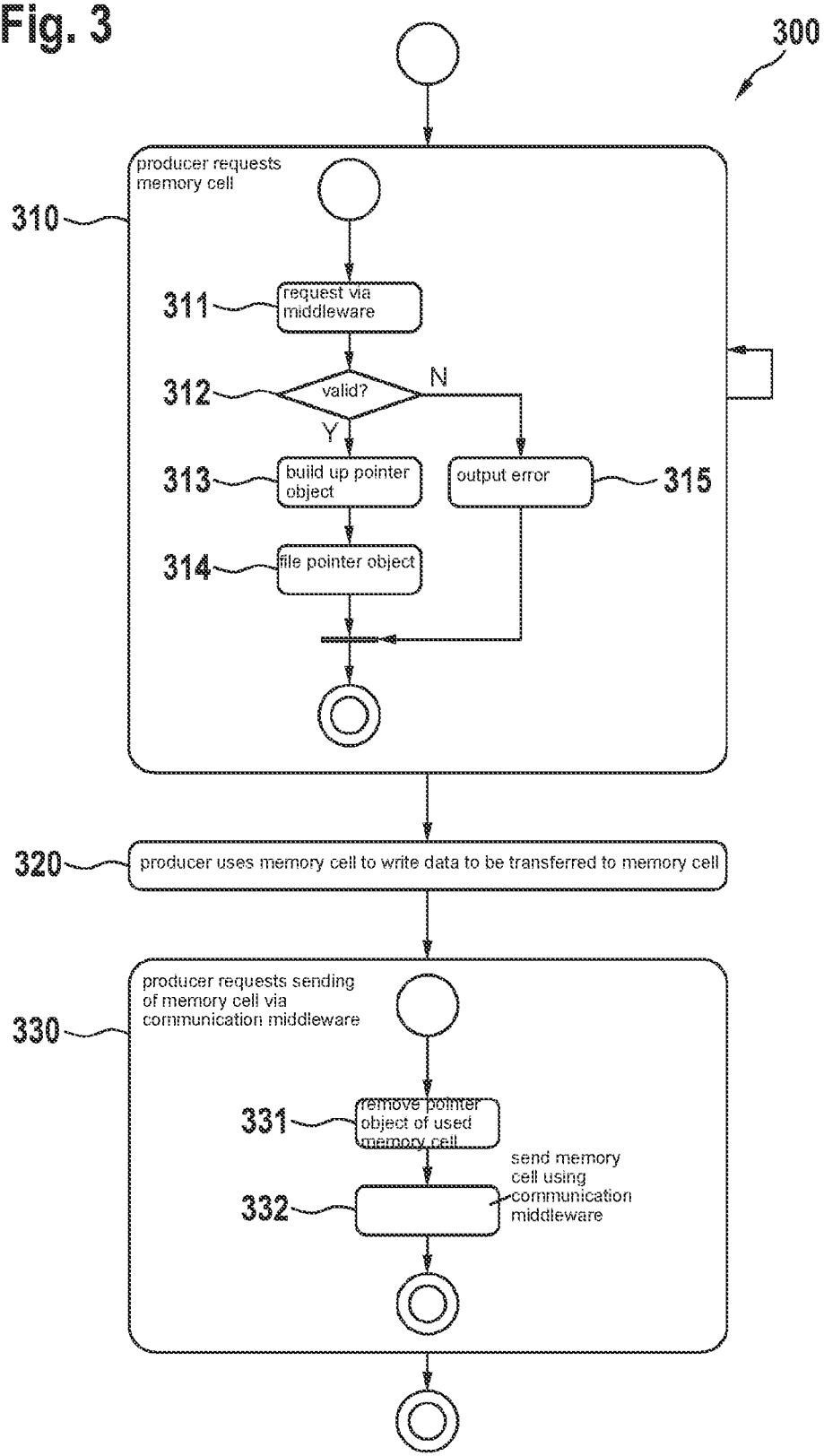

DATA STRUCTURE, MEMORY MEANS AND DEVICE

FIELD

The present invention provides a data structure for a memory means in an application system, a corresponding memory means, and a device.

BACKGROUND INFORMATION

In systems in which large volumes of data are processed, the copying of data may take up a high proportion of the system resources and may thereby become a costly matter.

In today's systems for driver assistance and at least semi-automated driving, multiple gigabytes are processed per second.

As a result, valuable system resources in the form of computing resources may be saved here when the copying of data is avoided as far as possible.

To fulfill safety requirements, communication networks must be resiliently designed to prevent a total failure. As a result, strategies must be developed for managing the limited resources.

In systems including multiple computing cores or different contexts of the execution (e.g., tasks in an operating system according to the OSEK specification (OSEK-OS)), communication middleware is frequently used, which ensures a consistent transfer of the data between concurrent parts of the software. Such a communication middleware provides methods with the aid of which a producer of data is able to transfer (or have transferred) the data to one or multiple consumer(s) with the aid of the middleware.

It is conventional to use a "zero copy" approach to avoid copies of the data to be transferred. A communication middleware according to the "zero copy" approach transfers data according to a two-step approach. In a first step, the producer requests memory space for filing the data to be transferred via the communication middleware. In a second step, the requested memory space is supplied to the consumer or consumers for reading out the data to be transferred.

With the hand-over of the data to be transferred to the communication middleware, the "ownership" for the memory space used for this purpose is typically assigned to the middleware. During the filing by the producer and the read-out by the consumer, the "ownership" of the memory space used for this purpose lies with the respective user (producer, consumer).

"Ownership" shall be understood to mean that only the respective process (producer, consumer, optionally middleware) has exclusive access (for writing or reading) to the memory space.

In the automotive field, the AUTOSAR standard is conventionally used, which, among other things, provides communication methods according to the "zero copy" approach.

SUMMARY

In situations in which a user (producer, consumer), in other words, a user process, is the owner of a memory space, in other words, of a memory cell, and during which this user process is terminated abnormally, in other words, erroneously, so-called memory leaks may occur.

This is due to the fact that the used memory cell is no longer released due to the abnormal termination of the user process.

The memory cell is indicated to the communication middleware as occupied. This results in blocked memory cells in the memory means, which are no longer accessible and which are not cleaned up by the communication middleware or the operating system, in other words, provided for use again.

When a user process requests a lot of memory space for the transfer of large data volumes, situations in which memory leaks occur may cause a total system failure.

The present invention provides a data structure for a memory means in an application system, the memory means including a memory cell.

In accordance with an example embodiment of the present invention, the data structure includes a management structure. This management structure is configured to hold a pointer object, in other words, a reference or a pointer, to the memory cell.

With the aid of the data structure of the present invention, it is now possible to clean up occupied memory cells when these are occupied by an abnormally terminated user process.

Whether a user process was abnormally terminated may, for example, be recognized with the aid of the conventional heartbeat method.

If the abnormal termination of a user process was recognized, it is possible to recognize and release the memory cell via the management structure of the data structure of the present invention based on the memory means held there to the occupied memory cell.

In this way, the resilience of the application system may be increased.

In the present example, an application system may be understood to mean a system made up of a number of application programs, i.e., automated processes which partially resort to a shared hardware. A part of the shared hardware may be a jointly utilized memory means. The application system may be configured to operate a vehicle in an at least semi-automated manner, preferably in a highly automated manner.

The memory means may be a jointly utilized memory means.

In the present example, a jointly utilized memory means (shared memory) may be understood as part of a physical memory which is utilized by multiple processes of an application system.

The jointly utilized memory means may be used for inter-process communication.

With the aid of a jointly utilized memory means, it is possible to implement a high performance data communication between multiple processors in a simple manner.

In the present example, a memory cell may be understood to mean a part of the memory means which may be identified, preferably unambiguously identified. An identification in the process typically takes place via a memory address. It may be a virtual memory address which, for example, is only valid in the context of a user process, or a physical memory address which, for example, is valid system-wide. Another, possibly unambiguous, identifier which is suitable for identifying the memory cell would also be possible.

In the present example, an application system may be understood to mean a system made up of a number of application programs, i.e., automated processes which partially resort to a shared hardware. A part of the shared hardware may be a jointly utilized memory means. The application system may be configured to operate a vehicle in an at least semi-automated manner, preferably in a highly automated manner.

According to one specific example embodiment of the data structure according to the present invention, the data structure is configured in such a way to build up the pointer object when the memory cell is requested by a user process of the application system.

In the present example, the creation of a pointer object may be understood to mean allocating memory space for the pointer object, and filing a corresponding reference to the target of the pointer object in the memory space. The reference to the target may be present in the form of an identifier, for example in the form of a start address of the memory space of the target.

According to one specific example embodiment of the data structure according to the present invention, the data structure is configured to dismantle the pointer object when the memory cell is released by a user process.

In the present example, the dismantling of a pointer object may be understood to mean releasing the memory space for the pointer object.

According to one specific example embodiment of the data structure according to the present invention, the data structure is configured in such a way that the memory cell is released when the user process was abnormally terminated.

In the present example, an abnormal termination of a user process may be understood to mean an erroneous or early termination of the user process. An abnormal termination may occur when, on the one hand, a process-internal reason exists for the premature abortion of the process. Reasons for this may be a memory overflow, a failed memory allocation, etc. Or, on the other hand, when a process-external reason exists for the premature abortion of the process. Again, multiple reasons may exist here.

According to one specific example embodiment of the data structure according to the present invention, the data structure includes a respective management structure for each user process.

This specific embodiment has the advantage that a cleanup of the memory cells occupied by a respective user process may be implemented in a simple manner, since only iteration across the respective management structure of the affected user process is required to release all memory cells occupied by this user process.

According to one specific example embodiment of the data structure according to the present invention, the management structure is filed in the jointly utilized memory means.

This specific embodiment has the advantage that the user processes (producer, consumer) and possibly a central management process of the application system may be separate processes, and accordingly different process contexts may run. As a result of the filing of the management structure or of the respective management structures in the jointly utilized memory means, nonetheless all processes may access the management structures when needed.

Another aspect of the present invention is a memory means. The memory means includes a data structure according to the present invention.

The memory means may be a jointly utilized memory means.

Another aspect of the present invention is a device. The device includes a memory means according to the present invention.

The device may be a control unit for a machine, for example. It is possible in the process for the machine to be a vehicle. It is furthermore possible in the process for the vehicle to be a vehicle which is operated in an at least semi-automated manner.

In the present example, a vehicle may be understood to mean a mobile means of transportation which may be used to transport persons (passenger traffic), goods (freight traffic) or tools (machines or auxiliary material). Depending on the application, these are referred to as:

land vehicles;
water craft;
aircraft.

Specific example embodiments of the present invention are described in greater detail hereafter based on the figures.

BRIEF DESCRIPTION OF THE DRAWINGS

FIG. 3 shows a flowchart of a method with reference to the data structure according to an example embodiment of the present invention.

DETAILED DESCRIPTION OF EXAMPLE EMBODIMENTS

Figure 1:
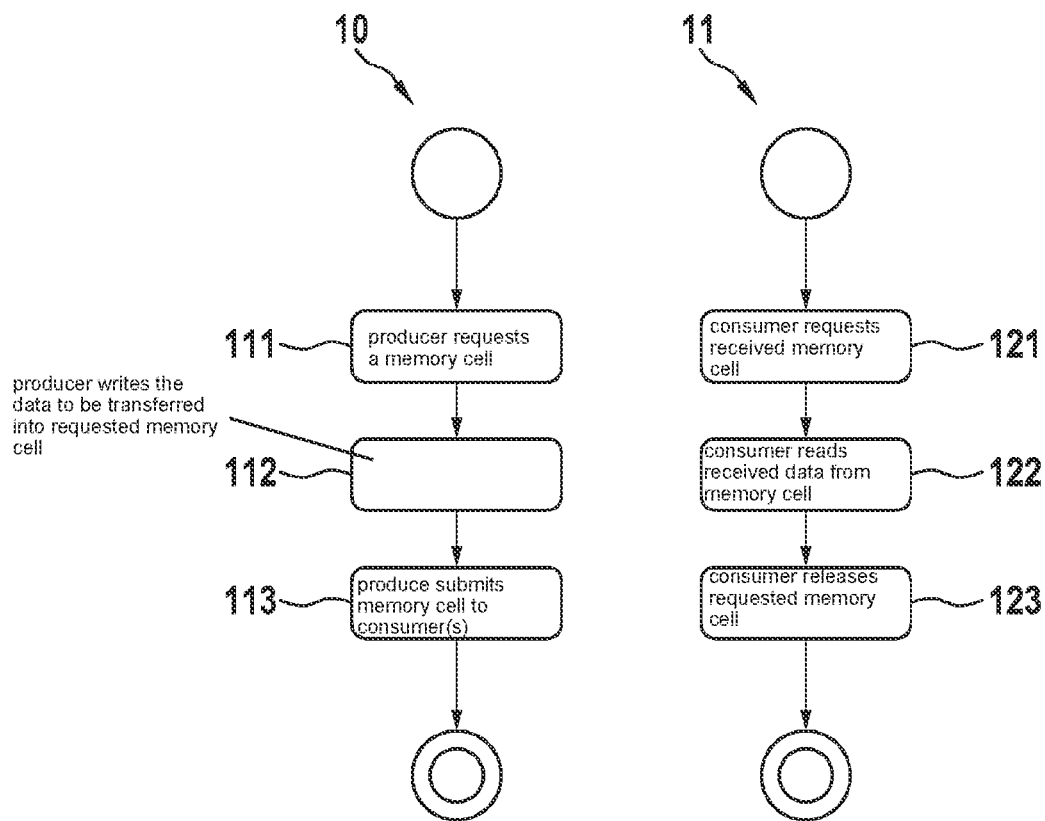
FIG. 1 shows a flowchart of a method using a "zero copy" approach.

FIG. 1 shows a flowchart of a method 100 using a "zero copy" approach. The diagram shows method 100 from the perspective of a producer 10 and from the perspective of a consumer 11 for data.

Figure 2:
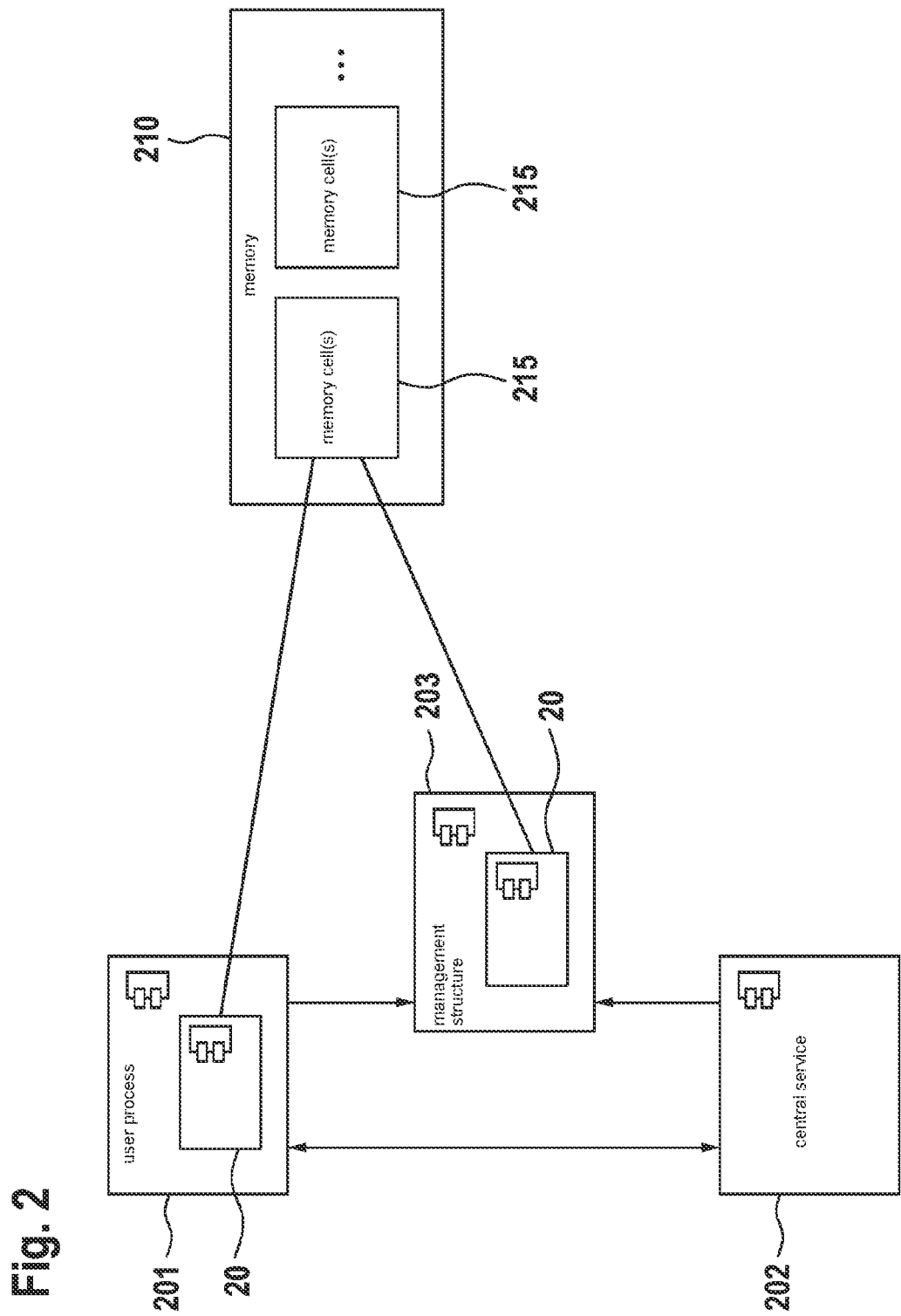
FIG. 2 shows a block diagram of a data structure according to an example embodiment of the present invention.

In step 111, producer 10 requests a memory cell 215 (see FIG. 2). Request 111 may take place via communication middleware of an application system.

If the request is successful, producer 10 receives a pointer object 20, in other words, a reference, to the requested memory cell 215. Upon a successful request, the ownership of memory cell 215 is assigned to producer 10, and the middleware loses it.

In step 112, producer 10 writes the data to be transferred into the requested memory cell 215.

In step 113, producer 10 submits memory cell 215 to consumer or consumers 11. The submission may take place via the communication middleware of the application system. The submission takes place at the request of producer 10. The ownership is assigned to the middleware again via memory cell 215.

A consumer 11 is informed about the receipt of a memory cell 215. The information may take place via the communication middleware of the application system. In step 121, consumer 11 then requests the received memory cell.

If the request is successful, consumer 11 also receives a pointer object 20 to the requested memory cell 215. Upon a successful request, the ownership of the memory cell is assigned to consumer 11, and the middleware loses it.

In step 122, consumer 11 reads the received data from memory cell 215.

In step 123, consumer 11 releases the requested memory cell 215, i.e., pointer object 20 of consumer 11 to memory cell 215 is typically dismantled. The release takes place at the request of consumer 11. In the process, the ownership is assigned to the middleware again via memory cell 215. As a result, memory cell 215 is available to further consumers, and possibly also to producer 10 or further producers again. With the aid of the middleware, memory cell 215 may also be cleaned up or used otherwise.

FIG. 2 shows a block diagram of a data structure 200 according to the present invention.

Data structure 200 includes a management structure 203, which is configured to hold a pointer object 20 to a memory cell 215.

The management of data structure 200 takes place in communication middleware in the background of, for example, a "zero copy" approach.

In the process, it is possible that a respective management structure 203 is set up by the middleware per user process 201 (i.e., per producer 10/sender or consumer 11/receiver), since in this way all memory cells listed therein may be implicitly assigned to the respective user process 201.

Management structure 203 holds a pointer object 20 to memory cell 215 which is used by user process 201.

Furthermore, the block diagram shows a central service 202 for managing data structure 200. Central service 202 may take over different tasks in the process. On the one hand, the central service may be configured to carry out a heartbeat method with respect to user process 201. With the aid of such a method, central service 202 may recognize whether and when a user process 201 was abnormally terminated.

In the event that a user process 201 was abnormally terminated, central service 202 may use management structure 203, for example to identify memory cells 215 in memory means 210 which are used by the abnormally terminated user process 201 via pointer object or objects 20 held in management structure 203, and to possibly clean them up or release them, i.e., to make them available again to further users in the application system.

The identification of memory cells 215 may take place by the address or another form of the reference in the memory of memory cell 215 since the same is unambiguously assignable.

It is possible that central service 202 includes methods which are suitable for searching for, and possibly removing, individual entries in management structure 203.

FIG. 3 shows a flowchart of a method 300 with reference to data structure 200 according to the present invention.

In step 310, producer 10 requests a memory cell to write data to be transferred thereto. Before the requested memory cell 215 is transferred to producer 10, initially, in step 311, the memory cell is requested via the communication middleware. Thereafter, in step 312, the check takes place as to whether the requested memory cell 215 is valid.

In the event that the requested memory cell 215 is valid, a pointer object 20 which points to the memory cell is build up in step 313. In step 314, this pointer object 20 is filed in management structure 203 of data structure 200 and held there.

In the event that the requested memory cell 215 is not valid, an error may be output with step 315.

The step of requesting 310 may be repeated multiple times in the process.

After the ownership on memory cell 215 has been assigned to producer 10, producer 10 in step 320 uses memory cell 215 to write the data to be transferred to memory cell 215.

The transfer of the ownership may, for example, take place by transferring a pointer object 20 to memory cell 215 of producer 10. The transferred pointer object 20 is a copy of pointer object 20 which is held in management structure 203, while producer 10 holds the ownership on memory cell 215.

After the writing process has ended, producer 10 requests sending 330 of memory cell 215 via the communication middleware.

According to the shown specific embodiment, in step 331, producer 10 for this purpose removes pointer object 20 of the used memory cell 20 from management structure 203. Thereafter, in step 332, the sending of the memory cell takes place with the aid of the communication middleware.

It is possible in the process that step 331 is not carried out by producer 10, but rather by the communication middleware in connection with the sending of memory cell 215.

What is claimed is:

1. A device for a jointly utilized memory for inter-process communication in an application system, the memory including a memory cell, the device comprising:
    a processor; and
    a storage in which a management structure is stored;
    wherein:
        the management structure is configured to hold, for a user process of the application system given access to the memory cell, a pointer object to the memory cell; and
        the processor is configured to control the management structure to release the memory cell in response to a termination of the user process that is predefined as being abnormal.

2. The device as recited in claim 1, wherein the processor data structure is configured to build up the pointer object in the management structure when the memory cell is requested by the user process of the application system.

3. The device as recited in claim 2, wherein the release is performed by removing the pointer object from the management structure.

4. The device as recited in claim 1, wherein the user process is one of a plurality of user processes, and the management structure is one of a plurality of respective management structures, that each is respectively assigned exclusively to a respective one of the plurality of user processes.

5. The device as recited in claim 1, wherein the management structure is stored in the jointly utilized memory.

6. A jointly utilized memory for inter-process communication in an application system, comprising:
    a memory cell; and
    a management structure configured to:
        hold, for a user process of the application system given access to the memory cell, a pointer object to the memory cell; and
        release the memory cell in response to a termination of the user process that is predefined as being abnormal.

7. A device, comprising:
    a jointly utilized memory for inter-process communication in an application system, the memory including:
        a memory cell; and
        a management structure configured to:
            hold, for a user process of the application system given access to the memory cell, a pointer object to the memory cell; and
            release the memory cell in response to a termination of the user process that is predefined as being abnormal.

8. A device for a jointly utilized memory for inter-process communication in an application system including a plurality of user processes, the memory including a plurality of memory cells, wherein each of one or more of the plurality of user processes is grantable access to more than one of the memory cells, the device comprising:
    a storage; and a processor, wherein for each of the one or more of the plurality of user processes, the processor is configured to:
   maintain in the storage a respective management structure that includes a respective pointer object for each of the memory cells whose access is currently granted to the respective user process, the granting of the access preventing access of the respective memory cells by others of the user processes; and
   in response to a release of the grant of the access of any of the memory cells by the respective user process, remove from the respective management structure of the respective user process the respective pointer object of the released memory cell.

* * * * *